US011641617B2

(12) United States Patent
Lindoff et al.

(10) Patent No.: US 11,641,617 B2
(45) Date of Patent: May 2, 2023

(54) MECHANISMS FOR INITIAL ACCESS TO A RADIO ACCESS NETWORK

(71) Applicant: Telefonaktiebolaget LM Ericsson (publ), Stockholm (SE)

(72) Inventors: Bengt Lindoff, Bjärred (SE); Magnus Åström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 451 days.

(21) Appl. No.: 16/339,072

(22) PCT Filed: Nov. 10, 2016

(86) PCT No.: PCT/EP2016/077257
§ 371 (c)(1),
(2) Date: Apr. 3, 2019

(87) PCT Pub. No.: WO2018/086692
PCT Pub. Date: May 17, 2018

(65) Prior Publication Data
US 2019/0261258 A1   Aug. 22, 2019

(51) Int. Cl.
*H04W 48/16* (2009.01)
*H04W 36/08* (2009.01)
(Continued)

(52) U.S. Cl.
CPC ............ *H04W 48/16* (2013.01); *H04W 36/08* (2013.01); *H04W 56/001* (2013.01);
(Continued)

(58) Field of Classification Search
CPC ... H04W 48/16; H04W 36/08; H04W 56/001; H04W 72/0453; H04W 88/06; H04W 48/18
(Continued)

(56) References Cited

U.S. PATENT DOCUMENTS

2012/0290866 A1\* 11/2012 Curtiss ............. H04W 56/0035
713/501
2014/0153479 A1   6/2014 Aiouaz et al.
(Continued)

FOREIGN PATENT DOCUMENTS

CN         105900490 A    8/2016
EP           2129176 A2   12/2009
(Continued)

OTHER PUBLICATIONS

"Consideration on the System Information in NR", 3GPP TSG-RAN WG2 Meeting #94; R2-163743; Nanjing, P.R. China, May 23-27, 2016, pp. 1-6.

*Primary Examiner* — Kwang B Yao
*Assistant Examiner* — Xuan Lu
(74) *Attorney, Agent, or Firm* — Murphy, Bilak & Homiller, PLLC

(57) ABSTRACT

There is provided mechanisms for initial access to a radio access network. The method is performed by a wireless device. The wireless device is configured for accessing the radio access network using at least a first cellular RAT and a second cellular RAT. The method comprises obtaining system information using a first carrier frequency and the first RAT. The system information comprises inter-frequency cell information of the second RAT. The method comprises synchronizing with the second RAT using a second carrier frequency based on the obtained system information in order to establish initial access to the radio access network. The second carrier frequency is higher than the first carrier frequency.

20 Claims, 4 Drawing Sheets

(51) Int. Cl.
- *H04W 56/00* (2009.01)
- *H04W 72/04* (2023.01)
- *H04W 88/06* (2009.01)
- *H04W 48/12* (2009.01)
- *H04W 48/18* (2009.01)
- *H04W 72/0453* (2023.01)

(52) U.S. Cl.
CPC ....... *H04W 72/0453* (2013.01); *H04W 88/06* (2013.01); *H04W 48/12* (2013.01); *H04W 48/18* (2013.01)

(58) Field of Classification Search
USPC .......................................................... 370/329
See application file for complete search history.

(56) References Cited

U.S. PATENT DOCUMENTS

| | | | |
|---|---|---|---|
| 2014/0179311 A1 | 6/2014 | Liang et al. | |
| 2015/0257041 A1* | 9/2015 | Su ................... | H04W 52/0225 |
| | | | 455/437 |
| 2015/0373667 A1 | 12/2015 | Rajurkar et al. | |
| 2016/0073305 A1* | 3/2016 | Yang .................. | H04W 36/30 |
| | | | 455/436 |
| 2016/0277991 A1* | 9/2016 | Yang .................. | H04W 48/00 |
| 2016/0353361 A1* | 12/2016 | Jung .................. | H04W 48/16 |
| 2017/0215227 A1* | 7/2017 | Duan .................. | H04W 48/18 |
| 2018/0020462 A1* | 1/2018 | Xiong ................. | H04W 76/16 |

FOREIGN PATENT DOCUMENTS

| | | |
|---|---|---|
| EP | 3065480 A1 | 9/2016 |
| WO | 2013159334 A1 | 10/2013 |
| WO | 2016072696 A2 | 5/2016 |
| WO | 2016086956 A1 | 6/2016 |
| WO | 2016137532 A1 | 9/2016 |

* cited by examiner

MECHANISMS FOR INITIAL ACCESS TO A RADIO ACCESS NETWORK

TECHNICAL FIELD

Embodiments presented herein relate to a method, a wireless device, a computer program, and a computer program product for initial access to a radio access network.

BACKGROUND

In communications networks, there may be a challenge to obtain good performance and capacity for a given communications protocol, its parameters and the physical environment in which the communications network is deployed.

For example, wireless devices, such as standard smartphones, are commonly designed for low cost and low power consumption. At the same time there could be a end-user requirement for multi-RAT functionality (where RAT is short for radio access technology) where legacy RATs (such as the second or third generation mobile communication systems "2G"/"3G") must be supported by the wireless device even if the wireless device is indicated as supporting a frontier RAT (such as the fourth generation mobile communication systems "4G"). One reason for this is the gradual deployment of new RATs, i.e. the use of a single new RAT is restricted from an end-user perspective.

Further evolutions of mobile communication systems (such as the fifth generation mobile communication systems "5G", also known as New Radio (NR), millimeter wave (mmW) networks, or Ultra Dense Networks (UDN)) using new RATs are currently under development. Hence, wireless devices supporting a 5G mobile communications system may also be required to support legacy mobile communication systems.

Such further evolutions of mobile communications systems will typically require gigabits per second performance and bandwidths in the order of 100 MHz, i.e. 5 times the current Long Term Evolution (LTE) bandwidth. In order to find such free bandwidths, the carrier frequency may need to increase a factor 10-20 above currently used carrier frequencies (in the order of 1-3 GHz) used in 2G, 3G or 4G mobile communication systems. Alternatively, a 5G network could co-exist on a lower carrier frequency and a higher carrier frequency.

Radio access network nodes in these new mobile communications systems need to transmit synchronization signals in order for wireless devices to, during the process of initial access, or cell search, process, detect and synchronize to the radio access network nodes using the new RAT.

Cost and power constraints typically imply that the radio components of the wireless device are just sufficiently good to fulfill certain requirements. One such performance-critical radio component is the crystal oscillator, i.e. the component providing the reference clock for the radio. This component is typically running at 26 MHz, driven by a low-cost 32 kHz reference clock, and has an (open loop) uncertainty of 10-15 ppm. Hence, once the wireless device is turned on, the frequency error at current 2G/3G/4G RAT carrier frequencies (2 GHz) can be up to 20-30 kHz. This needs to be taken care of in the wireless device during the initial cell search process. For example, before the wireless device can receive data, the crystal oscillator should be calibrated such that the frequency error is reduced to, say, less than in the order of 100 Hz.

For higher 5G carrier frequencies, the crystal oscillator running at 26 MHz could be replaced with a crystal oscillator running at a higher frequency (such as in the order of 200 MHz) in order to manage higher phase noise arising from frequency multiplication. However, this comes at a drawback in terms of a higher open loop uncertainty, up to 50 ppm. Furthermore, the synchronization signal may be transmitted less often, say every 40 ms instead of every 5 ms as in LTE. As a result of this, search intervals and possibly also averaging will need to be increased in order to achieve a frequency lock in order to successfully detect the synchronization signal with the same performance as in previous RATs.

Hence, there is a need for an improved cell search procedure for mobile communications systems where multiple RATs are used.

SUMMARY

An object of embodiments herein is to provide an efficient cell search procedure for a multi-RAT mobile communications system.

According to a first aspect there is presented a method for initial access to a radio access network. The method is performed by a wireless device. The wireless device is configured for accessing the radio access network using at least a first cellular RAT and a second cellular RAT. The method comprises obtaining system information using a first carrier frequency and the first RAT. The system information comprises inter-frequency cell information of the second RAT. The method comprises synchronizing with the second RAT using a second carrier frequency based on the obtained system information in order to establish initial access to the radio access network. The second carrier frequency is higher than the first carrier frequency.

Advantageously this provides efficient initial access to the radio access network in a multi-RAT mobile communications system.

Advantageously this provides fast initial cell search synchronization, yielding low power consumption in the wireless device whilst providing a good end-user experience.

According to a second aspect there is presented a wireless device for initial access to a radio access network. The wireless device is configured for accessing the radio access network using at least a first cellular RAT and a second cellular RAT. The wireless device comprises processing circuitry. The processing circuitry is configured to cause the wireless device to obtain system information using a first carrier frequency and the first RAT. The system information comprises inter-frequency cell information of the second RAT. The processing circuitry is configured to cause the wireless device to synchronize with the second RAT using a second carrier frequency based on the obtained system information in order to establish initial access to the radio access network, wherein the second carrier frequency is higher than the first carrier frequency.

According to a third aspect there is presented a wireless device for initial access to a radio access network. The wireless device is configured for accessing the radio access network using at least a first cellular RAT and a second cellular RAT. The wireless device comprises processing circuitry and a storage medium. The storage medium stores instructions that, when executed by the processing circuitry, cause the wireless device to perform operations, or steps. The operations, or steps, cause the wireless device to obtain system information using a first carrier frequency and the first RAT. The system information comprises inter-frequency cell information of the second RAT. The operations, or steps, cause the wireless device to synchronize with the second RAT using a second carrier frequency based on the obtained system information in order to establish initial access to the radio access network. The second carrier frequency is higher than the first carrier frequency.

According to a fourth aspect there is presented a wireless device for initial access to a radio access network. The wireless device is configured for accessing the radio access network using at least a first cellular RAT and a second cellular RAT. The wireless device comprises an obtain module configured to obtain system information using a first carrier frequency and the first RAT. The system information comprises inter-frequency cell information of the second RAT. The wireless device comprises a synchronize module configured to synchronize with the second RAT using a second carrier frequency based on the obtained system information in order to establish initial access to the radio access network. The second carrier frequency is higher than the first carrier frequency.

According to a fifth aspect there is presented a computer program for initial access to a radio access network, the computer program comprising computer program code which, when run on a wireless device, causes the wireless device to perform a method according to the first aspect.

According to a sixth aspect there is presented a computer program product comprising a computer program according to the fifth aspect and a computer readable storage medium on which the computer program is stored. The computer readable storage medium could be a non-transitory computer readable storage medium.

It is to be noted that any feature of the first, second, third, fourth, fifth and sixth aspects may be applied to any other aspect, wherever appropriate. Likewise, any advantage of the first aspect may equally apply to the second, third, fourth, fifth and/or sixth aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

Figure 1:
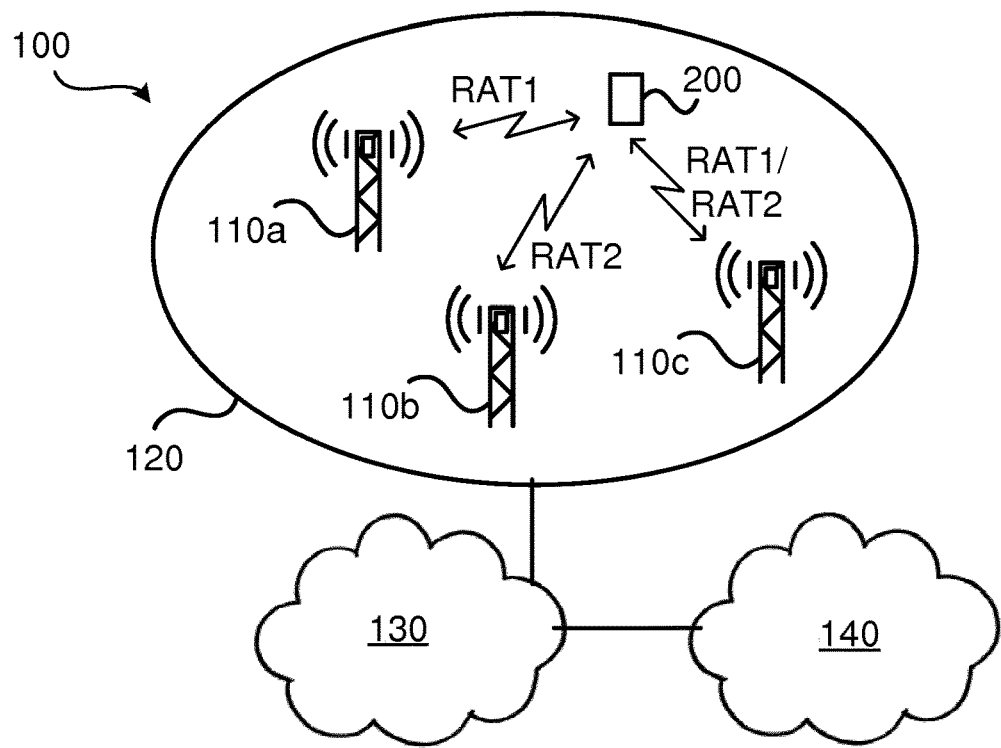
FIG. 1 is a schematic diagram illustrating a communication network according to embodiments.

FIG. 1 is a schematic diagram illustrating a communications network 100 where embodiments presented herein can be applied. The communications network 100 comprises a radio access network 120, a core network 130, and a service network 140.

The radio access network 120 comprises at least one radio access network node 110a, 110b, 110c and is operatively connected to the core network 130 which in turn is operatively connected to the service network 140. The radio access network node 120 thereby enables wireless devices 200 to access services and exchange data as provided by the service network 140.

The communications network 100 is assumed to support at least two RATs. This is in FIG. 1 schematically illustrated by radio access network node 110a being configured for communication using a first RAT (RAT1), radio access network node 110b being configured for communication using a second RAT (RAT2) and radio access network node 110c being configured for communication using both the first RAT and the second RAT. Further, the wireless device 200 is assumed to have a multi-RAT functionality. That is, the wireless device 200 is configured to selectively switch between using at least the first RAT and the second RAT. Examples of RATs will be provided below.

Examples of wireless devices 200 include, but are not limited to, mobile stations, mobile phones, handsets, wireless local loop phones, user equipment (UE), smartphones, laptop computers, tablet computers, sensors, modems, repeaters, and network equipped Internet of Things devices.

Examples of radio access network nodes 110a, 110b, 110c include, but are not limited to, radio base stations, base transceiver stations, node Bs, evolved NodeBs, g NodeBs, and access points.

As the skilled person understands, the communications network 100 may comprise a plurality of radio access network nodes 110a, 110b, 110c, each providing network access to a plurality of wireless devices 200. The herein disclosed embodiments are not limited to any particular number of radio access network nodes 110a, 110b, 110c, or wireless devices 200.

In order for a wireless device 200 to access services and exchange data with the service network 140 it must establish a connection to a radio access network node 110a, 110b, 110c. The establishment of connection comprises an initial access procedure e.g. for performing an initial cell search.

The initial cell search for 3G and 4G mobile communications systems operating typically around 2-3 GHz may need frequency gridding, i.e. a cell search on a number of hypothesized carrier frequencies in a frequency band around the nominal carrier frequency. In order to achieve initial frequency lock the Primary Synchronisation Channel (PSCH), also denoted Physical Synchronisation Channel is used in 3G and the Primary Synchronization Signal (PSS) is used in 4G. The PSCH and the PSS are typically robust for frequency errors up to 3-4 kHz, but since the frequency error may be up to 25 kHz, there is a need for 5-6 grid points in the initial cell search process.

In order to simplify cell reselection, a radio access network node supporting 4G broadcasts system information blocks (SIBs) containing, e.g., inter-frequency cell reselection (SIB 5) and inter-RAT cell reselection (SIB 6-7 or another (future defined) SIB number for 5G carriers). Corresponding functionalities exist for 2G and 3G mobile communications systems.

5G mobile communications systems as currently being developed are designed to suit a frequency range from below 1 GHz (including frequency bands at 450 MHz, 800 MHz and/or 900 MHz) up to 100 GHz. A foundation in the design is flexibility, partly since a large part of the spectrum has not been allocated or auctioned yet. As a result, it is not yet known what the different frequency bands or bandwidths will be that will be allocated for 5G mobile communications systems.

Without a priori knowledge of, e.g., synchronization signals, the wireless device 200 will need to search the entire potential spectrum bandwidth in order to identify the desired carrier frequency, or frequency band for that matter, to camp on. This could be a very time consuming and power inefficient process due to the large amount of spectrum the wireless device 200 may need to search.

Furthermore, due to decreased crystal oscillator accuracy (due to using the needed ≥200 MHz crystal oscillator for ≥10 GHz carriers), typically in the order of 50 ppm, and higher carrier frequencies, a substantially larger search grid must be searched in order detect the synchronization signal in 5G mobile communications systems compared to 2G/3G/4G mobile communications systems.

For illustrative purposes, assume that a synchronization signal is located at a carrier frequency in a frequency band within a 1 GHz 5G-assigned frequency spectrum in which operators' frequency band allocations in turn are partitioned into combinations of e.g., 50 MHz, 100 MHz and/or 200 MHz allocations. For only the single frequency band this will result in unreasonably many synchronization signal combinations be practically feasible for the wireless device 200 to search in order to find the carrier frequency.

For illustrative purposes, further assume that a 60 GHz carrier frequency is used with a 60 kHz subcarrier spacing and that a maximum synchronization error is scaled proportionally to the subcarrier spacing (i.e., 4 times 3.75 kHz=15 kHz). Instead of 5-6 grid points as is the case for 4G mobile communications systems, the initial frequency error would be up to ±3 MHz and would require up to 400 grid points in the worst case scenario (200 grid points in average) for one single location of the synchronization signal.

As described in WO2016086956A1, by first synchronizing towards a lower frequency band, the crystal oscillator inaccuracy may be decreased significantly. However, due to the flexible frequency band allocations, all possible frequency band combinations still remain to be searched through in order for the wireless device 200 to successfully complete its initial access procedure.

Non-limiting examples of frequency bands to be searched through in order for the wireless device 200 to successfully complete its initial access procedure for the second RAT are frequency bands located higher than 10 GHz, such as the 28 GHz, 37 GHz, 39 GHz and 64-71 GHz frequency bands. These frequency bands have been allocated to 5G by the Federal Communications Commission (FCC). In these frequency bands, due to their large bandwidths and multitude of frequency band combinations, but also less accurate crystal oscillators needed for mmW communications, initial access may prove to be a cumbersome task.

The embodiments disclosed herein relate to mechanisms for initial access to the radio access network 120. In order to obtain such mechanisms there is provided a wireless device 200, a method performed by the wireless device 200, a computer program product comprising code, for example in the form of a computer program, that when run on a wireless device 200, causes the wireless device 200 to perform the method.

Figure 2:
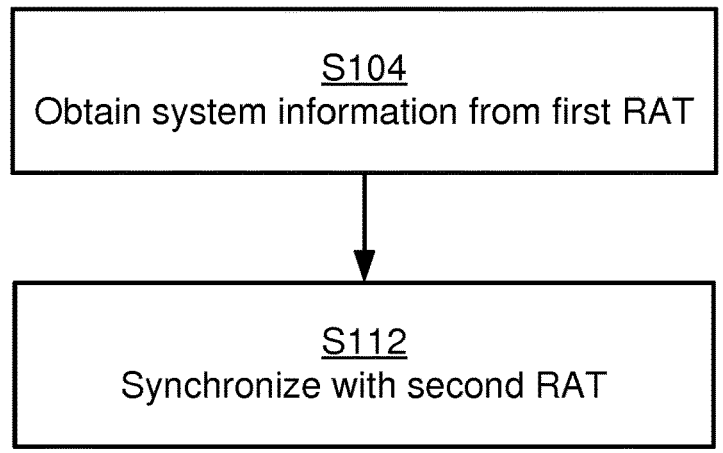
FIGS. 2, 3, and 4 are flowcharts of methods according to embodiments.
Figure 3:
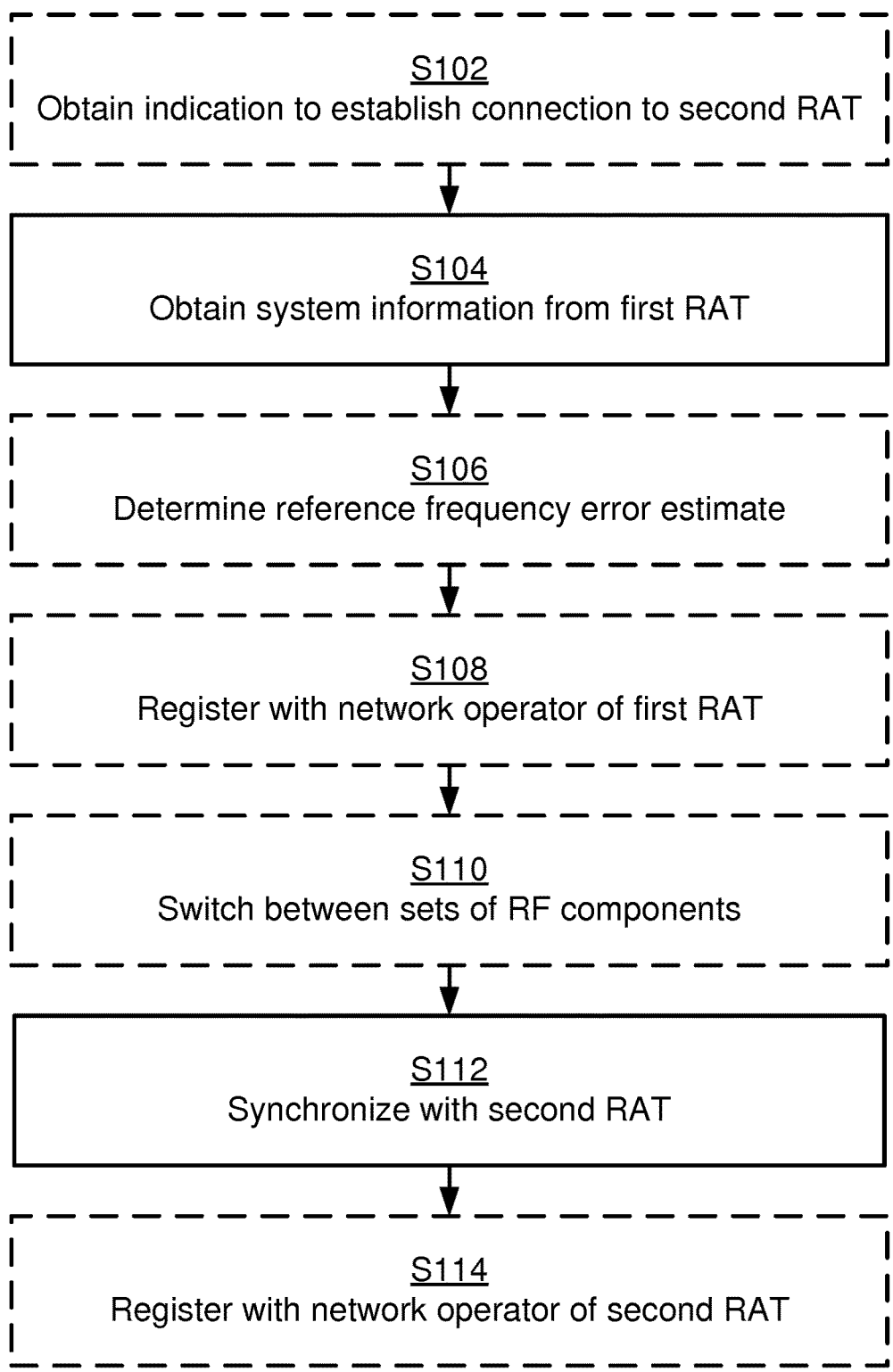

FIGS. 2 and 3 are flow charts illustrating embodiments of methods for initial access to a radio access network 120. The methods are performed by the wireless device 200. The methods are advantageously provided as computer programs 720, see FIG. 7.

Reference is now made to FIG. 2 illustrating a method for initial access to a radio access network 120 as performed by the wireless device 200 according to an embodiment.

The wireless device 200 is configured for accessing the radio access network 120 using at least a first cellular RAT and a second cellular RAT. Each of the first RAT and the second RAT is associated with its own carrier frequency. In turn, each carrier frequency band is located in a frequency band allocated for the RAT in question. That is, the carrier frequency of the first RAT (denoted first carrier frequency) is located in a frequency band and the carrier frequency of the second RAT (denoted second carrier frequency) is located in another frequency band. The second frequency band is located higher up in frequency than the first frequency band and hence the second carrier frequency is higher than the first carrier frequency.

The wireless device 200 utilizes the first RAT operating on a low carrier frequency to get an understanding about existing other RATs and the spectrum of these other RATs. Hence, the wireless device 200 is configured to perform step S104:

S104: The wireless device 200 obtains system information using a first carrier frequency and the first RAT. The system information comprises inter-frequency cell information of the second RAT. Examples of system information and inter-frequency cell information will be provided below.

The wireless device 200 thereby scans a low frequency RAT and not only makes a first synchronization with the radio access network 120, for example to correct an initial frequency error, but also to read the system information. The obtained system information is assumed to comprise information about inter-RAT (per default also inter-frequency) cells and their properties. Hence, the wireless device 200 may receive information about the synchronization signal transmission of the second RAT as transmitted on a second carrier frequency. Based on the obtained system information, the wireless device 200 may now synchronize with the second RAT without the otherwise necessary extensive frequency search in a high frequency band in which the second carrier frequency is located. The wireless device 200 thus uses the obtained system information when performing initial access to the second RAT at a second carrier frequency, where the second carrier frequency is higher than the first carrier frequency. Hence, the wireless device 200 is configured to perform step S112:

S112: The wireless device 200 synchronizes with the second RAT using a second carrier frequency based on the obtained system information in order to establish initial access to the radio access network 120.

Embodiments relating to further details of initial access to a radio access network 120 as performed by the wireless device 200 will now be disclosed.

It could be that the wireless device 200 when obtaining the system information in step S104 further obtains an indication that the connection to the first RAT fulfils a quality criterion for registering with the first RAT. However, the synchronizing with the second RAT in step S112 could then be performed even when the quality criterion for registering with the first RAT is fulfilled.

There are different examples of first RATs and second RATs. According to a embodiment the first RAT uses any of a Global System for Mobile communications (GSM) air interface, a Universal Mobile Telecommunications System (UMTS) air interface, and a Long Term Evolution (LTE) air interface, and the second RAT uses a new radio (NR) air interface. That is, according to this embodiment the first RAT uses a 2G, 3G or 4G air interface and the second RAT uses a 5G air interface.

Reference is now made to FIG. 3 illustrating methods for initial access to a radio access network 120 as performed by the wireless device 200 according to further embodiments. It is assumed that steps S104, S112 are performed as described above with reference to FIG. 2 and a thus repeated description thereof is therefore omitted.

There may be different reasons for the wireless device 200 to use the second RAT (and thus the second carrier frequency) during the initial access procedure. According to some aspects the wireless device 200 is instructed or otherwise notified to establish a connection to the second RAT. Hence, according to an embodiment the wireless device 200 is configured to perform step S102:

S102: The wireless device 200 obtains an indication to establish a connection to the second RAT before obtaining the system information.

There could be different sources of the indications. For example, a subscriber entity 240 (see, FIG. 5) could be configured to be registered to prioritize a sear for (or use of) the second RAT. Hence, according to an embodiment the indication is obtained from the subscriber entity 240 of the wireless device 200. For example, an application as run by the wireless device could require a low latency service and thus configured to instruct, or require, the wireless device 200 to use the second RAT. Hence, according to an embodiment the indication is obtained from an application run by the wireless device 200.

There could be different examples of system information. Examples of system information include, but are not limited to, system signature or system synchronization (SS) information, or information from which SS may be derived, or information giving indication to a carrier frequency where such SS information may exist (for instance an E-UTRA Absolute Radio Frequency Channel Number (EARFCN) number (where E-UTRA is short for evolved UMTS Terrestrial Radio Access), or corresponding carrier counters for 5G SS carriers). Further embodiments include such information carrying information regarding the location of the synchronization signal of the second carrier frequency in either time, frequency, or both time and frequency.

There could be different examples of inter-frequency cell information in the system information obtained from the system information in step S104. In some aspects the first RAT is for an LTE connection and the inter-frequency cell information is included in LTE SIB 5, 6, 7, or another SIB (which today may be unused) indicating inter-frequency reselection cells. In this respect, this so-called another SIB could either include only synchronization carrier frequency (or the center/carrier frequency) for the second RAT or it could include more information of the second RAT, corresponding to the information that is included in SIB1-2 in LTE. Hence, according to an embodiment the inter-frequency cell information is included in an LTE SIB. In some aspects the first RAT is for a UMTS connection and the inter-frequency cell information is included in an UMTS SIB.

The inter-frequency cell information could include synchronization properties, e.g., an indication of a synchronization frequency of the second RAT. Hence, according to an embodiment the inter-frequency cell information comprises synchronization properties of the second RAT. Optionally, the inter-frequency cell information further comprises necessary information for the wireless device 200 to perform initial access, e.g., system bandwidth, initial access channel properties such that the wireless device 200 only needs to identify the synchronization information and system frame number (SFN) of the second RAT.

There could be different ways for the wireless device 200 to perform the synchronizing with the second RAT (at the second carrier frequency). According to some aspects the synchronizing at the second carrier frequency is based on a reference frequency error estimate as determined from the first carrier frequency. Hence, according to an embodiment the wireless device 200 is configured to perform step S106:

S106: The wireless device 200 determines a reference frequency error estimate between a local reference frequency of the wireless device 200 and the first carrier frequency. The synchronizing with the second RAT (at the second carrier frequency) is then based on the reference frequency error estimate. That is, the reference frequency error estimate could be used to reduce the reference frequency error between the local second carrier frequency as determined by the local oscillator of the wireless device 200 and the true vale of the second carrier frequency.

In some aspects the wireless device 200 does not register with a network operator of the first RAT in order to obtain at least some of the system information in step S104. Hence, according to an embodiment the system information is obtained without the wireless device 200 registering with a network operator of the first RAT.

In some aspects the wireless device 200 registers with the network operator of the first RAT in order to obtain at least some of the system information (that may not be transmitted in broadcast information, but may be necessary for the wireless device in the search for the second RAT) in step S104. Hence, according to an embodiment the wireless device 200 is configured to perform step S108:

S108: The wireless device 200 registers, using the first carrier frequency, with a network operator of the first RAT before obtaining the system information.

Registration as performed in step S108 could be required if the system information to be obtained is not transmitted from the radio access network nodes 110a, 110b using broadcast. For example, at least some of the system information could be transmitted using unicast or multicast, or another service, which would require registration as in step S108 by the wireless device 200.

In general terms, the wireless device 200 comprise radio frequency (RF) components which are used during transmission and reception of RF signals, such as used during the initial access of the wireless device. In some aspects the wireless device 200 comprises sets of RF components, where each set of RF components is designed for a specific RAT. According to an embodiment the wireless device 200 comprises at least a first set of RF components and a second set of RF components. The wireless device 200 is according to this embodiment configured to perform step S110:

S110: The wireless device 200 switches from using the first set of RF components to using the second set of RF components between obtaining system information and synchronizing with the second RAT.

Examples of RF components include, but are not limited to antennas, fillers, low noise amplifiers (LNAs), etc. The RF components could be part of the communications interface 220 of the wireless device 200, see below.

Once the wireless device 200 has synchronized with the second RAT as in step S112 the wireless device 200 could register with the network operator. Hence, according to an embodiment the wireless device 200 is configured to perform step S114:

S114: The wireless device 200 registers, using the second carrier frequency, with a network operator of the second RAT after having synchronized with the second RAT (as in step S112).

There could be different kinds of network operators for the wireless device 200 to register with in step S108 and/or step S114. According to an embodiment the network operator is a home network operator of the subscriber entity 240 of the wireless device 200. According to another embodiment the network operator has a roaming agreement with the home network operator.

Further in this respect, assuming that the first RAT is used by a network operator, in one embodiment the system information is obtained only when the network operator of the first RAT is the home network operator of the subscriber entity 240 of the wireless device 200, or the network operator has a roaming agreement with the home network operator.

Figure 4:
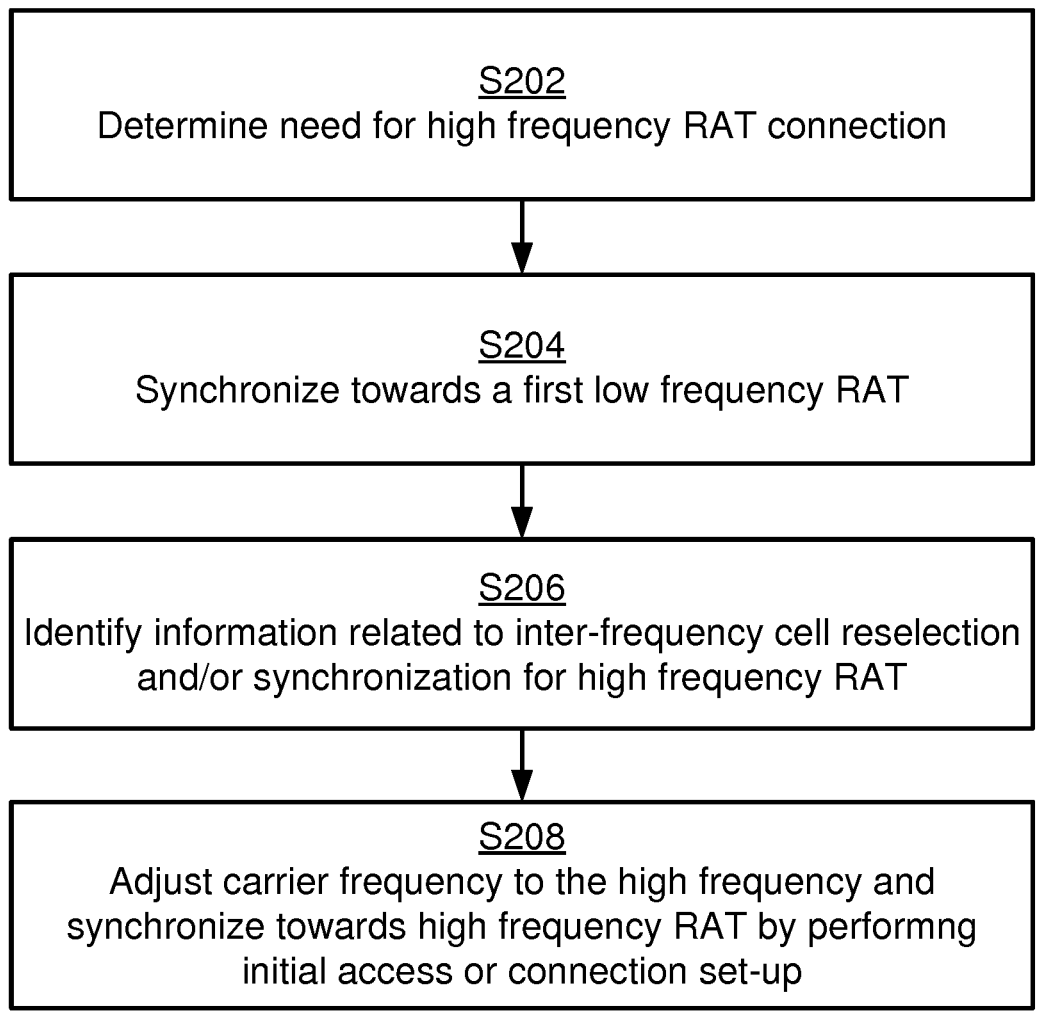

One particular embodiment for initial access to the radio access network 120 based on at least some of the above embodiments will now be disclosed with reference to the flow chart of FIG. 4.

S202: The wireless device 200 determines that it has a need for a high frequency 5G connection. One way to implement step S202 is to perform step S102.

S204: The wireless device 200 synchronizes towards a radio access network node 110a, 110b using a first low carrier frequency (using a first RAT for either a 2G, a 3G, or a 4G connection). This synchronization reduces the crystal oscillator error in the wireless device 200 relative the carrier frequency up to an order of magnitude. Synchronization (at least with respect to a frequency error) towards the low frequency network can be made regardless of cell public land mobile network (PLMN), i.e. regardless of operator and hence without registration. Hence, the wireless device 200 is allowed to access SIB data to determine its home-PLMN (as included in SIB 1 in case of LTE). If the wireless device 200 found another PLMN, it could continue to search for its home PLMN on another carrier at the low frequency system bandwidth (i.e., at another first carrier frequency) if the broadcasted system information is not sufficient for the wireless device 200 to perform initial access at the second carrier frequency (i.e., if synchronizing with the second RAT using the second carrier frequency cannot be performed based on the thus far obtained system information). One way to implement step S204 is to perform step S104 (and possibly also step S108).

S206: The wireless device 200, once such a home PLMN cell is determined, reads other SIB data in which 5G inter-frequency cell reselection information exists. The wireless device 200 thereby has information about where in the spectrum it may find a high frequency band to access for the high frequency 5G connection. One way to implement step S206 is to perform step S104 and/or step S108.

S208: The wireless device 200, upon having identified a proper second frequency band, adapts its carrier frequency to the second frequency band and, without searching all possible carrier frequency possibilities of the second frequency band, directly performs initial access (also known as connection setup) towards at least one radio access network node 110b, 110c in the second frequency band. One way to implement step S208 is to perform step S112.

In summary, there have been disclosed methods for initial access using a wireless device 200. According to embodiments these methods enable a need for connection towards a 5G carrier frequency to be determined by the wireless device 200 (for example by obtaining an indication to establish a connection to the second RAT as in step S102). According to embodiments these methods enable the wireless device 200 to synchronize towards a first cell on a first low frequency (for example by obtaining system information using a first carrier frequency and the first RAT as in step S104). According to embodiments these methods enable the wireless device 200 to determine that either the first cell belongs to the home PLMN of the wireless device 200, or at least that the wireless device 200 is allowed to connect to the first cell (for example as in step S104 and/or S106). According to embodiments these methods enable the wireless device 200 to obtain inter-frequency cell information associated to a synchronization signal transmission of a 5G carrier from the first cell (for example as in step S104 and/or S106). According to embodiments these methods enable the wireless device 200 to adapt its carrier frequency to the synchronization signal of the 5G carrier frequency according to the inter-frequency cell information (for example by switching from using a first set of RF components to using a second set of RF components as in step S108). According to embodiments these methods enable the wireless device 200 to synchronize towards, and perform connection setup to, the 5G mobile communications system (for example by synchronizing with the second RAT using a second carrier frequency based on the obtained system information as in step S110).

Figure 5:
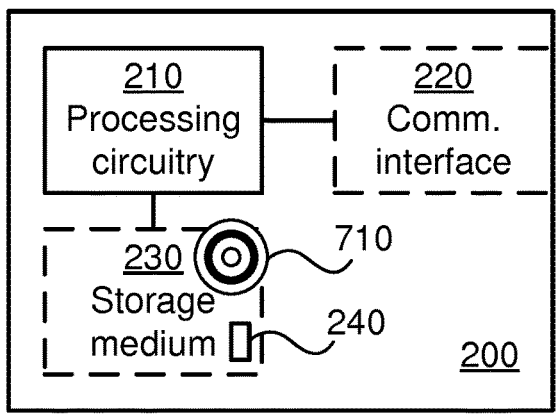
FIG. 5 is a schematic diagram showing functional units of a wireless device according to an embodiment.

FIG. 5 schematically illustrates, in terms of a number of functional units, the components of a wireless device 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 710 (as in FIG. 7), e.g. in the form of a storage medium 230. The processing circuitry 210 may further be provided as at least one application specific integrated circuit (ASIC), or field programmable gate array (FPGA).

Particularly, the processing circuitry 210 is configured to cause the wireless device 200 to perform a set of operations, or steps, S102-s114, S202-S208, as disclosed above. For example, the storage medium 230 may store the set of operations, and the processing circuitry 210 may be configured to retrieve the set of operations from the storage medium 230 to cause the wireless device 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The wireless device 200 may further comprise a communications interface 220 at least configured for communications with a radio access network node 110a, 110b, 110c. As such the communications interface 220 may comprise one or more transmitters and receivers, comprising analogue and digital components, such as the above-mentioned RF components. The processing circuitry 210 controls the general operation of the wireless device 200 e.g. by sending data and control signals to the communications interface 220 and the storage medium 230, by receiving data and reports from the communications interface 220, and by retrieving data and instructions from the storage medium 230.

According to an embodiment the wireless device 200 further comprises a subscriber entity 240. The subscriber entity 240 holds subscription information of the wireless device 200. Examples of subscriber identities include, but are not limited to subscriber identity module or subscriber identification module (SIM), Embedded-SIM (eSIM), and Embedded Universal Integrated Circuit Card (eUICC).

Other components, as well as the related functionality, of the wireless device 200 are omitted in order not to obscure the concepts presented herein.

Figure 6:
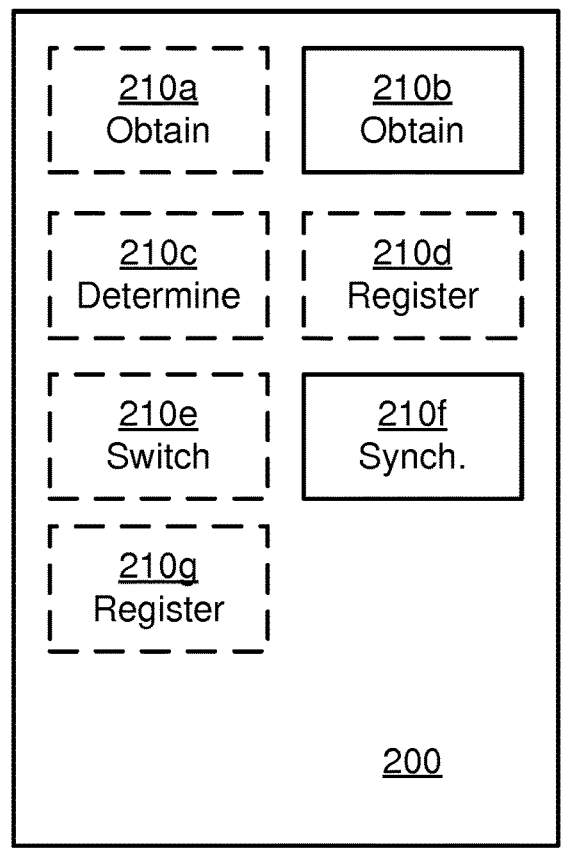
FIG. 6 is a schematic diagram showing functional modules of a wireless device according to an embodiment.

FIG. 6 schematically illustrates, in terms of a number of functional modules, the components of a wireless device 200 according to an embodiment. The wireless device 200 of FIG. 6 comprises a number of functional modules; an obtain module 210*b* configured to perform step S104 and a synchronize module 210*f* configured to perform step S112. The wireless device 200 of FIG. 6 may further comprise a number of optional functional modules, such as any of an obtain module 210*a* configured to perform step S102, a determine module 210C configured to perform step S106, a register module 210*d* configured to perform step S108, a switch module 210*e* configured to perform step S110, and a register module 210*g* configured to perform step S114. In general terms, each functional module 210*a*-210*g* may in one embodiment be implemented only in hardware and in another embodiment with the help of software, i.e., the latter embodiment having computer program instructions stored on the storage medium 230 which when run on the processing circuitry makes the wireless device 200 perform the corresponding steps mentioned above in conjunction with FIG. 6. It should also be mentioned that even though the modules correspond to parts of a computer program, they do not need to be separate modules therein, but the way in which they are implemented in software is dependent on the programming language used. Preferably, one or more or all functional modules 210*a*-210*g* may be implemented by the processing circuitry 210, possibly in cooperation with the communications interface 220 and/or the storage medium 230. The processing circuitry 210 may thus be configured to from the storage medium 230 fetch instructions as provided by a functional module 210*a*-210*g* and to execute these instructions, thereby performing any steps as disclosed herein.

Figure 7:
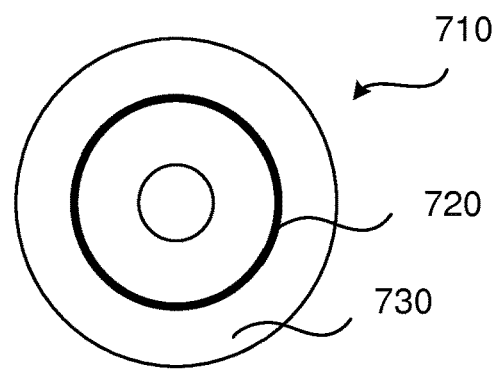
FIG. 7 shows one example of a computer program product comprising computer readable storage medium according to an embodiment.

FIG. 7 shows one example of a computer program product 710 comprising computer readable storage medium 730. On this computer readable storage medium 730, a computer program 720 can be stored, which computer program 720 can cause the processing circuitry 210 and thereto operatively coupled entities and devices, such as the communications interface 220 and the storage medium 230, to execute methods according to embodiments described herein. The computer program 720 and/or computer program product 710 may thus provide means for performing any steps as herein disclosed.

In the example of FIG. 7, the computer program product 710 is illustrated as an optical disc, such as a CD (compact disc) or a DVD (digital versatile disc) or a Blu-Ray disc. The computer program product 710 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 720 is here schematically shown as a track on the depicted optical disk, the computer program 720 can be stored in any way which is suitable for the computer program product 710.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for initial access to a radio access network (RAN), the method being performed by a wireless device configured for accessing the RAN using at least a first cellular radio access technology (RAT) and a second cellular RAT, the method comprising:
   obtaining system information broadcast by the RAN on a first carrier frequency using the first cellular RAT;
   based on the obtained system information, determining whether the system information is associated with a home public land mobile network (HPLMN) for the wireless device; and
   based on determining that the system information is associated with the HPLMN, synchronizing with the second cellular RAT using a second carrier frequency based on inter-frequency cell information of the second cellular RAT included in the obtained system information in order to establish initial access to the radio access network,
   wherein the second carrier frequency is higher than the first carrier frequency.

2. The method according to claim 1, wherein the inter-frequency cell information is included in a Long Term Evolution (LTE) System Information Block (SIB).

3. The method according to claim 1, wherein the inter-frequency cell information comprises synchronization properties of the second cellular RAT.

4. The method according to claim 1, wherein:
   the wireless device comprises at least a first set of radio frequency (RF) components and a second set of RF components; and
   the method further comprises switching from using the first set of RF components to using the second set of RF components between obtaining system information and synchronizing with the second cellular RAT.

5. The method according to claim 1, further comprising registering, using the second carrier frequency, with a network operator of the second cellular RAT after having synchronized with the second cellular RAT.

6. The method according to claim 5, wherein the network operator is a home network operator of a subscriber entity of the wireless device, or the network operator has a roaming agreement with the home network operator.

7. The method according to claim 1, wherein the system information is obtained without the wireless device registering with a network operator of the first cellular RAT.

8. The method according to claim 1, further comprising registering, using the first carrier frequency, with a network operator of the first cellular RAT before obtaining the system information.

9. The method according to claim 1, wherein the method further comprises, based on determining that the system information is not associated with the HPLMN, searching one or more further carrier frequencies for system information associated with the HPLMN broadcast by the RAN using the first cellular RAT.

10. The method according to claim 1, further comprising obtaining an indication to establish a connection to the second cellular RAT before obtaining the system information.

11. The method according to claim 10, wherein the indication is obtained from a subscriber entity of the wireless device.

12. The method according to claim 10, wherein the indication is obtained from an application run by the wireless device.

13. The method according to claim 1, wherein synchronizing with the second cellular RAT is performed even when a quality criterion for registering with the first cellular RAT is fulfilled in association with obtaining the system information broadcast by the RAN on the first carrier frequency.

14. The method according to claim 1, wherein:
the first cellular RAT uses any of the following: a Global System for Mobile communications (GSM) air interface, a Universal Mobile Telecommunications System (UMTS) air interface, and a Long Term Evolution (LTE) air interface; and
the second cellular RAT uses a new radio (NR) air interface.

15. The method according to claim 1, further comprising determining a reference frequency error estimate between a local reference frequency of the wireless device and the first carrier frequency, wherein synchronizing with the second cellular RAT is based on the reference frequency error estimate.

16. A non-transitory, computer-readable medium storing computer-executable instructions that, when executed by processing circuitry of a wireless device configured for accessing a radio access network (RAN) using at least a first cellular radio access technology (RAT) and a second cellular RAT, configure the wireless device to perform operations corresponding to the method of claim 1.

17. A wireless device configured for accessing a radio access network (RAN) using at least a first cellular radio access technology (RAT) and a second cellular RAT, the wireless device comprising:
processing circuitry; and
a storage medium storing computer-executable instructions that, when executed by the processing circuitry, configure the wireless device to:
obtain system information broadcast by the RAN on a first carrier frequency using the first cellular RAT;
based on the obtained system information, determine whether the system information is associated with a home public land mobile network (HPLMN) for the wireless device; and
based on determining that the system information is associated with the HPLMN, synchronize with the second cellular RAT using a second carrier frequency based on inter-frequency cell information of the second cellular RAT included in the obtained system information, in order to establish initial access to the radio access network,
wherein the second carrier frequency is higher than the first carrier frequency.

18. The wireless device according to claim 17, further comprising at least a first set of radio frequency (RF) components and a second set of RF components, wherein execution of the instructions further configures the wireless device to switch from using the first set of RF components to using the second set of RF components between obtaining system information and synchronizing with the second cellular RAT.

19. The wireless device according to claim 17, wherein execution of the instructions further configures the wireless device to register, using the second carrier frequency, with a network operator of the second cellular RAT after having synchronized with the second cellular RAT.

20. The wireless device according to claim 19, wherein the network operator is a home network operator of a subscriber entity of the wireless device, or the network operator has a roaming agreement with the home network operator.

* * * * *